United States Patent
Sales et al.

(10) Patent No.: US 12,298,530 B2
(45) Date of Patent: May 13, 2025

(54) DIFFRACTIVE OPTICAL DEVICE PROVIDING STRUCTURED LIGHT

(71) Applicant: VIAVI SOLUTIONS INC., San Jose, CA (US)

(72) Inventors: Tasso R. M. Sales, Rochester, NY (US); Stephen H. Chakmakjian, Fort Collins, CO (US); George Michael Morris, Victor, NY (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 11 days.

(21) Appl. No.: 16/455,291

(22) Filed: Jun. 27, 2019

(65) Prior Publication Data

US 2020/0004036 A1 Jan. 2, 2020

Related U.S. Application Data

(60) Provisional application No. 62/691,443, filed on Jun. 28, 2018.

(51) Int. Cl.
*G02B 5/18* (2006.01)
*G02B 27/42* (2006.01)

(52) U.S. Cl.
CPC ............ *G02B 27/425* (2013.01); *G02B 5/18* (2013.01); *G02B 27/4266* (2013.01); *G02B 2005/1804* (2013.01)

(58) Field of Classification Search
CPC .... G02B 27/425; G02B 5/18; G02B 27/4266; G02B 2005/1804; G02B 27/4288; G02B 5/1871

USPC ................... 359/569, 576; 372/32
See application file for complete search history.

(56) References Cited

U.S. PATENT DOCUMENTS

| | | | | |
|---|---|---|---|---|
| 5,151,917 A * | 9/1992 | Perilloux | ............ | H01S 3/034 372/101 |
| 5,917,845 A * | 6/1999 | Sales | ............ | G03H 1/0891 372/32 |
| 6,118,559 A | 9/2000 | Kathman et al. | | |
| 6,130,782 A * | 10/2000 | Iizuka | ............ | G02B 5/1866 359/569 |
| 6,292,297 B1 * | 9/2001 | Danziger | ............ | G02B 5/1876 359/566 |

(Continued)

FOREIGN PATENT DOCUMENTS

| CN | 103245423 A | 8/2013 |
|---|---|---|
| CN | 104199182 A | 12/2014 |

(Continued)

OTHER PUBLICATIONS

Ammer et al., "Diffractive optical elements with modulated zone", Journal of Modern Optics, 2000, 47:13, pp. 2281-2293.

(Continued)

*Primary Examiner* — Audrey Y Chang
(74) *Attorney, Agent, or Firm* — Mannava & Kang, P.C.

(57) ABSTRACT

A diffractive optical element including microstructures, along a surface of an optical material, having a phase profile to diffract input illumination into structured light of a plurality of different diffraction orders; wherein the phase profile is at least partially phase unwrapped is disclosed. Methods of generating the diffractive optical element is also disclosed.

15 Claims, 13 Drawing Sheets

(56) References Cited

U.S. PATENT DOCUMENTS

| | | | |
|---|---|---|---|
| 6,433,876 B1* | 8/2002 | Kuhn | G01B 9/04 356/520 |
| 7,538,891 B1 | 5/2009 | Mello et al. | |
| 8,463,077 B1 | 6/2013 | Weng et al. | |
| 8,630,039 B2 | 1/2014 | Shpunt | |
| 2002/0063962 A1* | 5/2002 | Takada | G02B 27/4272 359/569 |
| 2002/0149781 A1 | 10/2002 | Harasaki et al. | |
| 2009/0185274 A1 | 7/2009 | Shpunt | |
| 2010/0041239 A1* | 2/2010 | Flagello | G03F 7/70158 438/758 |
| 2010/0134621 A1 | 6/2010 | Namkoong et al. | |
| 2012/0105855 A1 | 5/2012 | Miyasaka et al. | |
| 2012/0192919 A1 | 8/2012 | Mizuyama | |
| 2012/0263362 A1* | 10/2012 | McAuley | G06T 5/10 382/131 |
| 2013/0294468 A1* | 11/2013 | Sridharan | H01S 3/2333 372/29.02 |
| 2015/0070472 A1 | 3/2015 | Chen et al. | |
| 2015/0362641 A1 | 12/2015 | Boyraz | |

FOREIGN PATENT DOCUMENTS

| | | |
|---|---|---|
| CN | 205720916 U | 11/2016 |
| CN | 106441564 A | 2/2017 |
| CN | 108121026 A | 6/2018 |
| EP | 2159040 A1 | 3/2010 |
| JP | 2001147308 | 5/2001 |
| JP | 2005509189 | 4/2005 |
| JP | 2014035920 | 2/2014 |
| KR | 100839167 B1 | 6/2008 |
| WO | 2015/191339 A1 | 12/2015 |

OTHER PUBLICATIONS

Ehbets et al., "Continous-relief fan-out elements with optimized fabrication tolerances", Optical Engineering, vol. 34, No. 12, Dec. 1, 1995, pp. 3456-3464.

Arrizon et al., "Iterative optimization of phase-only diffractive optical elements based on a lenslet array", Journal of the Optical Society of America, vol. 17, No. 12, Dec. 1, 2000, pp. 2157-2164.

Krasnaberski et al., "Efficient beam splitting with continuous relief DOEs and microlens arrays", Laser Resonators, MicroResonators, and Beam Control XIV, Proc. of SPIE, vol. 8326, Feb. 9, 2012, pp. 1-7.

Jun Lu et al., "An accurate and fast phase unwrapping algorithm based on constructed edge", China Academic Journal Electronic Publishing House, vol. 26, No. 1, Jan. 2015, 8 pages.

Mahesh Kondiparthi, "Three-dimensional profiling using a still shot", MEMS MOEMS, 13(1), 011106 (Jan.-Mar. 2014), 17 pages.

Jun Lu et al., "An Accurate and Fast Phase Unwrapping Algorithm Based on Constructed Edge", Journal of Optoelectronics—Laser, vol. 26, No. 1, Jan. 31, 2015, pp. 122-129. (With machine English translation).

Mahesh Kondiparthi, "Three-dimensional profiling using a still shot", Journal of Micro/Nanolithography MEMS and MOEMS, vol. 13, No. 1, Jan.-Mar. 2014, pp. 011106-1-011106-16.

Mark T. Gruneisen et al., "Wavelength-dependent characteristics of modulo N$\lambda$0 optical wavefront control", Applied Optics, vol. 45, No. 17, Jun. 10, 2006, pp. 4075-4083.

Dale A. Buralli et al., "Optical performance of holographic kinoforms", Applied Optics, vol. 28, Issue 5, Mar. 1, 1989, pp. 976-983.

Tan M. Barton et al., "Dual-wavelength operation diffractive phase elements for pattern formation", Optics Express, vol. 1, No. 2, Jul. 21, 1997, pp. 54-59.

R. W. Gerchberg et al., "A practical algorithm for the determination of phase from image and diffraction plane pictures", Optik vol. 35, No. 2, Year 1972, 6 pages.

Salman Noach et al., "Integrated diffractive and refractive elements for spectrum shaping", Applied Optics, vol. 35, No. 19, Jul. 1, 1996, pp. 3635-3639.

Ville Kettunen et al., "Diffractive elements designed to suppress unwanted zero order due to surface depth error", Diffractive Optics and Micro-Optics 2002, Jun. 3-6, 2002, 3 pages.

Ville Kettunen et al., "Diffractive elements designed to suppress unwanted zero order due to surface depth error", Optical Society of America, 2002, 13 pages.

* cited by examiner

Unit Cell

Original Function y = y(x)

Function quantized to
2 levels

Function quantized to
4 levels

Function quantized to
8 levels

DIFFRACTIVE OPTICAL DEVICE PROVIDING STRUCTURED LIGHT

RELATED APPLICATIONS

This application claims priority to U.S. Provisional Application No. 62/691,443, filed Jun. 28, 2018, the entire disclosure of which is hereby incorporated by reference.

FIELD OF THE INVENTION

The present invention is directed to a diffractive optical element including microstructures, along a surface of an optical material, having a phase profile to diffract input illumination into structured light of a plurality of different diffraction orders, wherein the phase profile is at least partially phase unwrapped. In an aspect, the structured light does not include a hot spot at the zero diffractive order. In another aspect, the structured light does not include any artifacts that substantially effect the uniformity of light intensity of the structured light provided in each of the diffractive orders. The diffractive optical element can be used in illumination systems, such as providing structured light for three-dimensional (3D) sensing, beam shaping, and displays.

BACKGROUND OF THE INVENTION

In a variety of applications, it is necessary to convert a source of radiation comprised of a single beam into a multiplicity of spatially isolated beamlets. Each beamlet propagates into a pre-specified direction with a pre-specified power relative to the other beamlets within said multiplicity of beamlets. This type of device is commonly referred to as a "beam splitter" that relies on the optical phenomenon of diffraction. Each beamlet generated by the beam splitter is a diffraction order. Each diffraction order has associated with it an efficiency, or fraction of the transmitted power. A well-known approach to implementing such a scheme is based on a diffractive optical elements (DOE). A diffractive optical element can allow the projection of an image pattern by patterning of a surface relief on a substrate material, such as fused silica or a polymer. The surface relief acts on an incident illumination source by altering its wavefront phase content in such a way that the diffraction pattern observed in the far field is tailored according to a desired format. An example of an illumination system is shown in FIG. 1. An illumination source, typically a laser of primary wavelength $\lambda$, provides an illuminating beam to be projected. Collimating optics may be used to collimate the illuminating beam, depending on the optical apparatus and optical requirements of the system. The DOE can act on the illuminating beam and can modify the illuminating beam in such a way that the observed diffraction pattern projects some specific pattern. In the example of FIG. 1, the illumination source is transformed into 5 spatially separated beams (diffraction orders) in the far field. In general, the illuminating beam transformation can obey an arbitrary specification, such as spot arrays or more complex images. The DOE itself can be described as a grating with a generally complicated unit cell. An example of a typical DOE is shown in FIG. 2. In particular, the DOE can include a unit cell (indicated by dashed lines) that can be repeated in a pattern or array, such as a 3×3 array.

A DOE can be a thin element, with a phase depth of $\pi$ (in the case of binary elements) or $2\pi$ (in the case of continuous-profile elements). A DOE can be confined to a single-wavelength operation, which is commonly referred to as the "design wavelength". As one deviates from the design wavelength, undesirable effects emerge. For example, a zero diffraction order relative power tends to increase rapidly, compared to the other diffraction orders. This important effect is unavoidable. In some cases, the zero diffraction order can be physically blocked. While in some cases the strong zero orders may not pose a problem, in certain applications its presence is absolutely unacceptable. One such application is 3D sensing where a DOE is used to project structured light of a desired pattern, which is a particular distribution of diffraction orders with prescribed location and relative intensity. In a 3D sensing application, the structured light pattern can be projected with an infrared laser directly towards a viewer. In this case a strong zero order directed towards the viewer may constitute an eye-safety issue and is, therefore, unacceptable for this type of application.

To manage the zero diffractive order issue while still using a DOE, existing approaches often need to sacrifice efficiency to produce a usable solution. In one example of such approach, a double-sided DOE has been proposed, such as described under U.S. Pat. No. 8,630,039. In this approach two DOEs were prepared on opposing sides of a substrate. A first DOE created a pattern that covered a narrower field of view with a more complex spot distribution. The second DOE, with wider field of view, generated a simpler distribution of spots. The combination of the two DOEs enabled a usable solution that addressed the eye safety problem described earlier. However, typical implementation of this two DOE approach is inefficient, because each DOE has a binary phase function with maximum theoretical efficiency of 80%, not including surface losses. The combination of the two DOEs thus provides a theoretical maximum of 64% efficiency. If one takes into account surface losses, then the actual efficiency is more likely around 50%.

Thus, it would be desirable to provide an optical diffractive device using a single-surface for efficiently generating structured light distribution with pre-specified diffractive order positions, while avoiding a hot spot at the zero diffraction order.

SUMMARY OF THE INVENTION

In an aspect, there is disclosed a diffractive optical element comprising microstructures, along a surface of an optical material, having a phase profile to diffract input illumination into structured light of a plurality of different diffraction orders; wherein the phase profile is at least partially phase unwrapped.

In another aspect, there is disclosed a method for generating diffractive optical element comprising calculating a phase profile that produces a structured light pattern; unwrapping the calculated phase profile of the structured light pattern to obtain a $2\pi P$ unwrapped phase profile; generating the $2\pi P$ unwrapped phase profile; and fabricating microstructures along a surface of an optical material based upon the generated $2\pi P$ unwrapped phase profile.

DETAILED DESCRIPTION OF THE DRAWINGS

The foregoing objects, features and advantages of the invention will become more apparent from a reading of the following description in connection with the accompanying drawings, in which.

Figure 11:
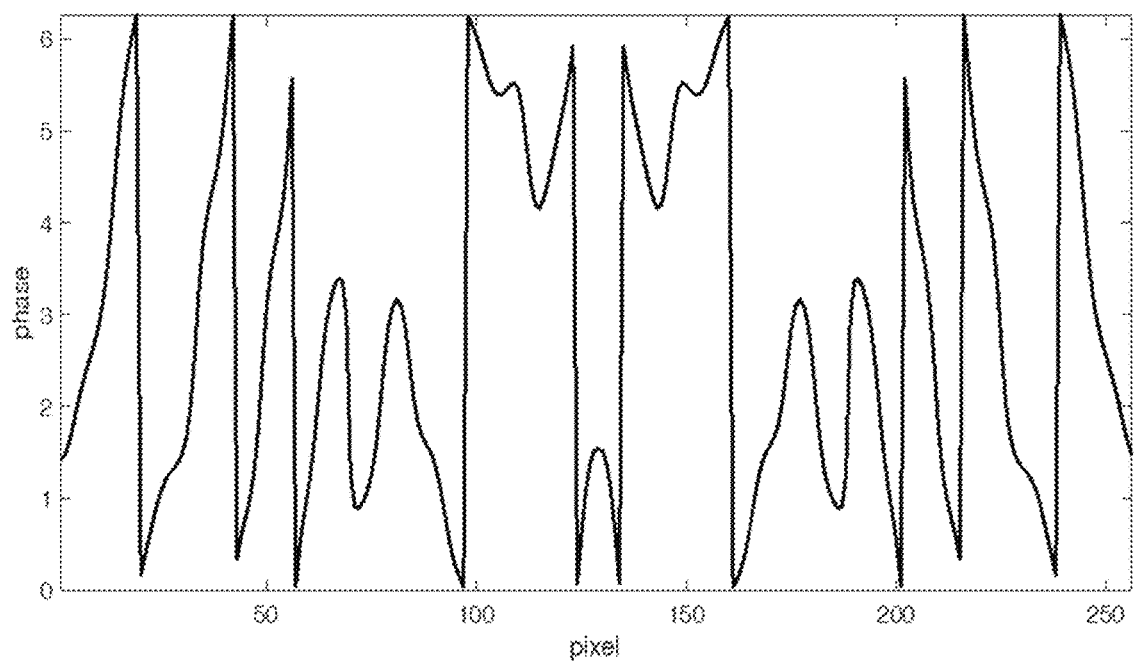
FIG. 11 is a phase profile in an example of a one-dimensional structured light phase profile that generates 41 spots or beamlets of structured light.
Figure 16:
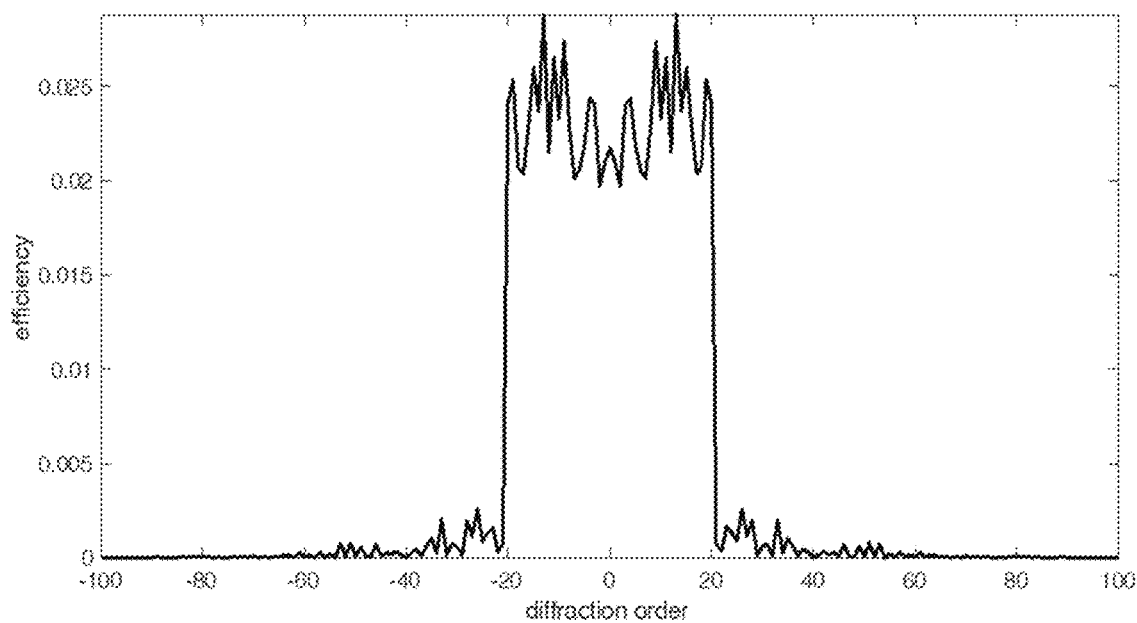
FIG. 16 is a graph of the diffraction pattern of a 4π-wrapped phase profile form with 5% depth error of the initial phase profile of FIG. 11 when partially unwrapped, which illustrates reduced uniformity intensity error among the 41 diffractive orders and the zero diffraction order hot spot avoided.
Figure 17:
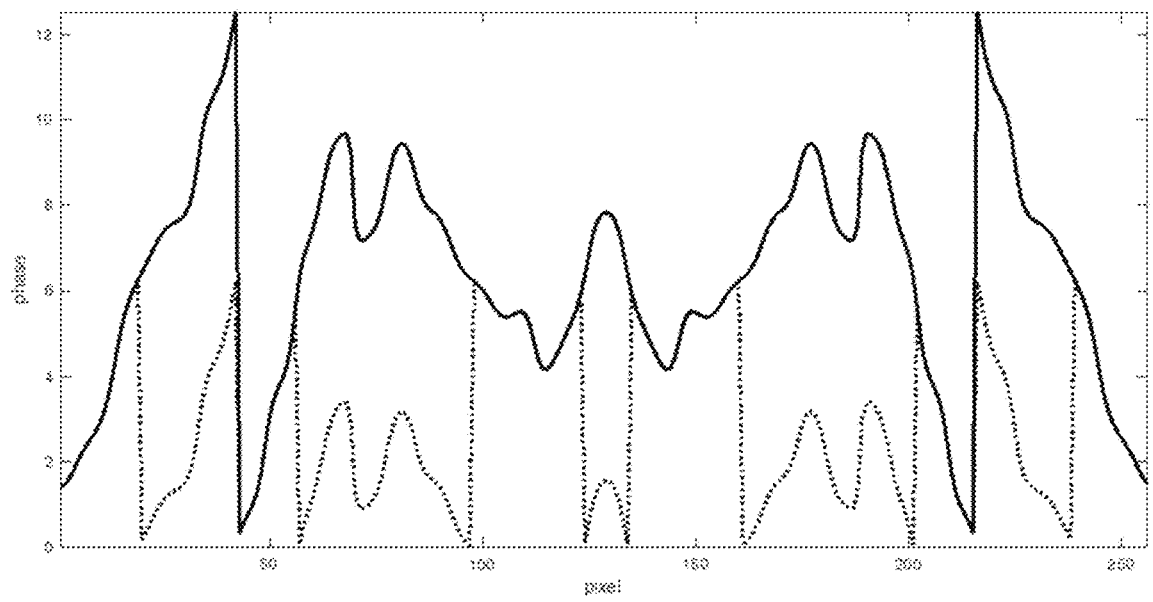
Figure 18:
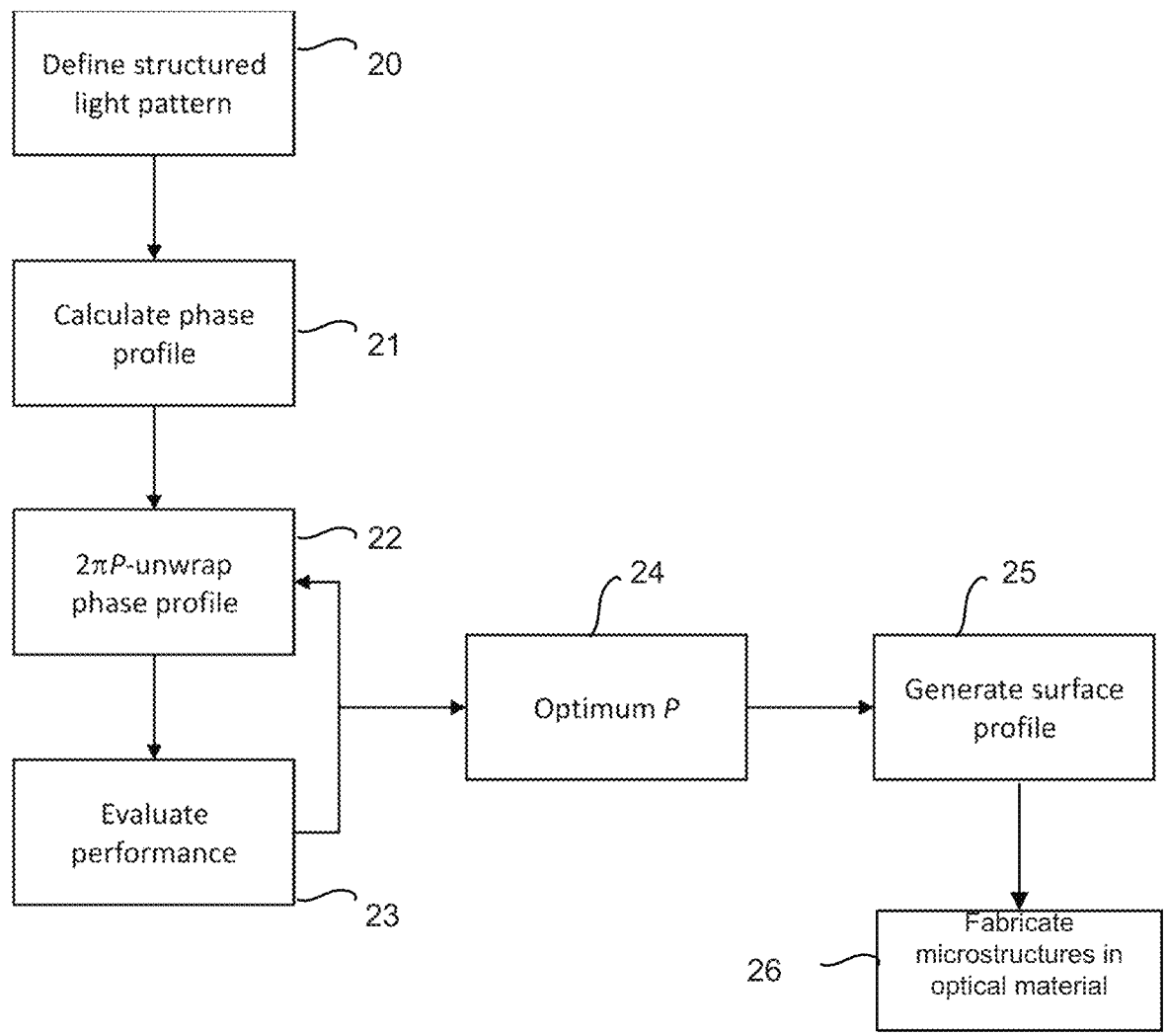

FIG. 17 is a graph of phase profile showing a 4π-wrapped phase profile (solid line) with 5% depth error that produced the diffraction pattern of FIG. 16 when the phase profile is partially unwrapped, where the initial phase profile of FIG. 11 (dotted line) is shown to illustrate the reduction in phase discontinuities in the 4π-wrapped phrase profile; and FIG. 18 is a flow diagram of the method for generating a diffractive optical element providing structured light in accordance with the present invention.

DETAILED DESCRIPTION OF THE INVENTION

The diffractive optical element 10 of the present invention can solve the drawbacks of conventional diffractive optical elements and periodic microlens arrays by including microstructures 11, along a surface of an optical material 12, having a phase profile to diffract input illumination into structured light of a plurality of diffraction orders, wherein the phase profile is at least partially phase unwrapped. In an aspect, the phase profile of the microstructures is a 2πP unwrapped phase profile. The diffractive optical element 10 of the present invention does not exhibit a detrimental presence of a strong intensity zero diffraction order causing a hot stop in the far field. In addition, the diffractive optical element 10 can operate without the strong intensity zero diffraction order over a broader wavelength range than conventional diffractive optical elements.

Figure 4:
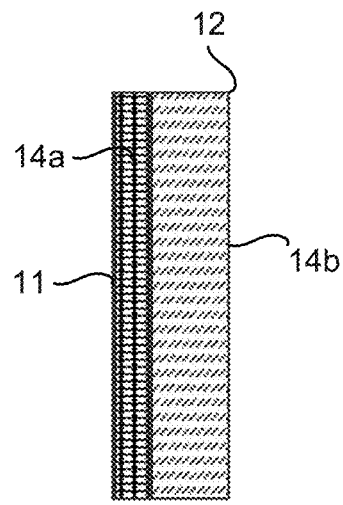
FIG. 4 is a block diagram of a diffractive optical element in accordance with the present invention.
Figure 5A:
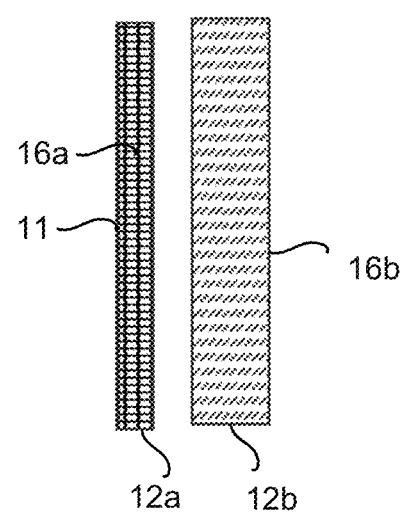
FIG. 5A is an exploded block diagram of a diffractive optical element in accordance with another aspect of the present invention.
Figure 5B:
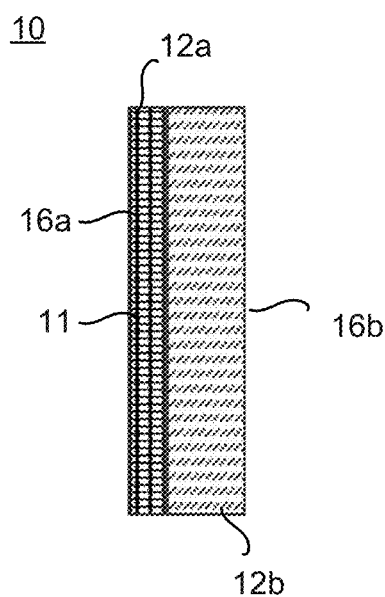
FIG. 5B is a block diagram of the diffractive optical element of FIG. 5A.
Figure 6:
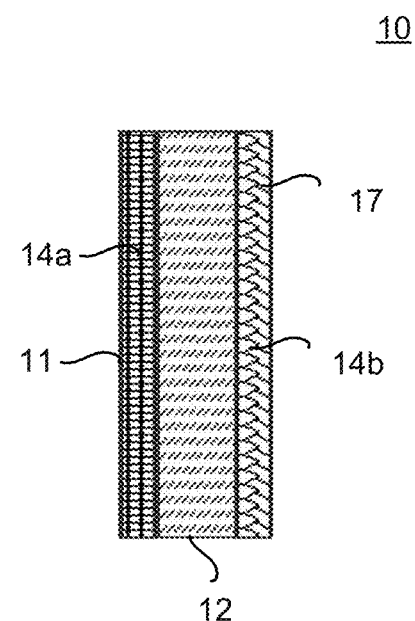
FIG. 6 is block diagram of a diffractive optical element in accordance with another aspect of the present invention.

As shown in FIGS. 4-6, a diffractive optical element 10 can include microstructures 11 along a surface of an optical material 12. The optical material 12 can be any material that can manipulate the flow of energy, such as light or electromagnetic radiation, in ultraviolet, visible, and infrared spectral regions. The optical material 12 can be selected based upon properties of the material, such as transparency, transmission, refractive index, etc. Non-limiting examples of an optical material 12 include plastic (e.g., polymer), glass or silica. The optical material 12 can be a single optical material (FIGS. 4 and 6) or can be a composite optical material (FIG. 5) including two or more different optical materials.

As shown in FIGS. 4-6, the diffractive optical element 10 can include an optical material 12 with microstructures 11 along a surface of the optical material 12. The microstructures 11 can be formed using any conventional technique, such as hot embossing, injection-molding, reactive-ion etching, or ion-beam milling. The microstructures 11 can have a phase profile, such as a 2πP unwrapped phase profile, that can diffract input illumination into structured light of a plurality of different diffraction orders. The phase profile can be phase unwrapped at least partially along the surface 14a of the optical material 12.

With regard to FIG. 4, the diffractive optical element 10 can include a first surface 14a that can extend along one or two dimensions each orthogonal to a depth along which the phase profile extends. The diffractive optical element 10 can include a single optical material 12. The microstructures 11 can be present along a first surface 14a of the optical material 12. In particular, the microstructures 11 can be formed along a surface 14a of the optical material. The surface of the single optical material 12 can be a first surface 14a that can be opposite a second surface 14b of the single optical material 12. In an aspect, the second surface 14b of the optical material 12 can be absent microstructures 11, i.e., is flat.

In operation, the diffractive optical element 10 can receive an input illumination through microstructures 11 along the first surface 14a. The input illumination can be any light source, for example a beam of light from a coherent light source, such as a laser, which for 3D sensing is of infrared wavelength(s) or ranges.

The structured light of a plurality of different diffraction orders can be in a variety of shapes, forms, and/or patterns. Non-limiting examples of the structured light include an array of spots, an array of dots, an array of beamlets, lines, arrays, geometric shapes, etc., and combinations thereof. The structured light can have pre-specified diffractive order positions so that the zero diffraction order has substantially the same intensity as other diffractive orders.

With regard to FIGS. 5A-5B, the diffractive optical element 10 can be a composite optical materials including a first optical material 12a and a second optical material 12b. The composite can have a first external surface 16a that is opposite a second external surface 16b. Microstructure 11 can be formed along the first external surface 16a of the first composite material 12a and then bonded onto an interior, flat surface of the second optical material 12b. The second external surface 16b of the second optical material 12b can be flat. In this manner, the diffractive optical element 10 having composite optical materials 12a, 12b (FIGS. 5A-5B) can have the same design as a diffractive optical element 10 having a single optical material 12 (FIG. 4).

In an aspect, the second optical material 12b can be a material having a greater relative stiffness, such as a rigid plastic or glass, as compared to the first optical material 12a. The first optical material 12a including the microstructures 11 can be affixed to the second optical material 12b as shown in FIG. 5B. In an aspect, an optical liquid adhesive (not shown) can be used to affix the first and second optical materials 12a, 12b to one another to form the composite optical material. Other manners of affixation can be used so long as a composite of optical material are present with microstructures 11 along a first external surface 16a of the first optical material 12a, and optionally without microstructures 11 along a second external surface 16b of the second optical material 12b.

In another aspect, the diffractive optical element 10 can include microstructures 11 along a first surface 14a of an optical material 12 and microstructures 17 along a second surface 14b of the optical material 12, as shown in FIG. 6. The microstructures 11 and 17 can have the same or different phase profile, such as a 2πP unwrapped phase profile. In an aspect, the second surface 14b can have microstructures 17 that are the same, e.g., have the same phase profile, as the microstructures 11 along the first surface 14a of the single optical material 12. In another aspect, the second surface 14b can have microstructures 17 that are different, e.g., have different phase profiles, as the microstructures 11 along the first surface 14a of the single optical material 12. The microstructures 11, 17 can be formed into the optical material 12, as discussed above, or can be formed from two different pieces of the same optical material and then affixed to one another, in the manner discussed above.

In another aspect, the diffractive optical element 10 can be a composite of a first optical material 12a and a second optical material 12b. The first optical material 12a can include a first external surface 16a including microstructures 11. The second optical material 12b can include a second external surface 16b including microstructures 17. The second external surface 16b can have microstructures 17 that are the same as the microstructures 11 along the first external surface 16a of the composite optical material. In another aspect, second external surface 16b can have microstructures 17 that are different from the microstructures 11 along the first external surface 16a of the composite optical material The diffractive optical element 10 of FIG. 6 has two structured light patterns, a first structured light pattern from the microstructures 11 along a surface 14a of the optical material 12, and a second structured light pattern from microstructures 17 along a second surface 14b of the optical material 12. The first structured light pattern can be the same or different from the second structured light pattern. Projected light from diffractive optical element 10 can be a combination of two structured light patterns, of a similar or dissimilar nature.

The phrase profile of the microstructures 11 can be at least partially phase unwrapped to reduce phase discontinuities along the surface of the optical material 12. In another aspect, the phase profile of the microstructures 11 can be less than completely (100%) phase unwrapped. The unwrapped phase profile can provide a zero diffraction order, of the plurality of diffraction orders, which can have substantially the same intensity as other diffraction orders, of the plurality of diffraction orders.

The microstructures 11 along the surface 14a can have a phase profile $$s = \frac{\Phi_P}{2\pi} \frac{\lambda_0}{(n-1)},$$

where $\Phi_P$ is the 2πP-unwrapped phase profile, n is an index of refraction of the surface, $\lambda_0$ is a central wavelength, and P is an integer selected which minimizes intensity of the zero diffraction order within a criteria of uniformity intensity error of the diffractive orders of structured light outputted from the device so that intensity of light in each of the plurality of diffraction orders can be substantially the same. In an aspect, the phase profile is less than completely unwrapped in order to minimize the uniformity or intensity error at or within such criteria. The phase profile can be along one or two dimensions.

The phase profile defining the microstructures 11 can be periodic along the surface 14a. The surface 14a extends along one dimension, but can extend along two orthogonal dimensions of the length and width of the surface 14a, which are both orthogonal to a depth dimension of the phase profile. The maximum depth dimension increases with each successive 2π unwrapping of the phase profile in reducing phase discontinuities until an acceptable uniformity of intensity error is achieved while the zero diffraction order hot spot can be avoided.

It is possible to design a diffractive optical element 10 that can efficiently project a structured light when the illumination wavelength assumes a specific value $\lambda_0$. For other values of wavelength $\lambda \neq \lambda_0$, performance can be severely degraded because the phase relation necessary for optimal image projection is no longer valid. As previously indicated, a major feature observable in virtually all diffractive optical elements operating at a wavelength other than the design is the increase in the intensity of the zero diffraction order with respect to the average intensity of the pattern of interest. In addition to operation outside of the design wavelength, as the angular spread of the projected diffraction pattern, the field-of-view (FOV) increases, it becomes very challenging to ensure accurate fabrication of the theoretical surface profile. Small variations in the phase profile, such as phase depth errors for example, can make it nearly impossible to minimize the zero diffraction order sufficiently to make the diffractive optical element practical.

It has been demonstrated that it is possible to have diffractive optical elements operating with a few specific values of wavelength (typically 1 or 2 values) if the depth of the surface relief that defines the diffractive optical element is increased. The rationale for this approach is based on the understanding that the phase relations necessary to ensure proper operation of the diffractive optical element can be satisfied as the total depth is increased, as indicated by S.

Noach, A. Lewis, Y. Arieli, and N. Eisenberg, "Integrated diffractive and refractive elements for spectrum shaping," Appl. Opt. 35, 3635-3639 (1996), the disclosure of which is incorporated by reference in its entirety. However, while the reasoning is correct, the increase of the total depth is neither a necessary nor a sufficient condition for acceptable multi-wavelength performance. Using such an approach, it has been shown that images can be satisfactorily projected at two distinct wavelengths (I. M. Barton, P. Blair, and M. Taghizadeh, "Dual-wavelength operation diffractive phase elements for pattern formation," Opt. Express 1, 54-59 (1997)), the disclosure of which is incorporated by reference in its entirety. In this case, the surface relief required the use of 16 phase levels and the images were formed off-axis, in such a way that the zero diffraction order was not part of the projected structured light (image). An important reason to offset the image is to avoid using the zero diffraction order, which tends to increase considerably in intensity when operating under several wavelengths. This may be due to the design itself not being optimized to suppress the zero diffraction order or to fabrication errors that invariably degrade performance. This approach, however, cannot be used in applications such as 3D sensing.

There are several strategies that can be used to generate a diffractive optical element that projects an arbitrary image. These strategies are suitable for monochromatic operation and result in a phase structure with total phase depth equal to $2\pi$ radians. In the case of binary phase profiles, the maximum phase depth is $\pi$, but the projected image is no longer arbitrary, it needs to be centrosymmetric. Prior work, as described above, enables the design of elements appropriate for the projection of images under dual-wavelength operation. For this purpose, the maximum phase depth can be increased beyond $2\pi$ radians. Although this approach can be convenient for dual-wavelength operation it presents at least two serious limitations. First, it does not allow precise control of the zero diffraction order intensity. In this situation, the usual solution is to offset the image separating it from the zero diffraction order. As a consequence, if the zero diffraction order intensity increases the main pattern cannot be affected, although it certainly can reduce efficiency because a considerable part of the energy is concentrated on the zero diffraction order. This option, however, is not available in the case where the presence of a strong zero diffraction order cannot be tolerated, such as for optical sensing. Second, deep diffractive elements generally present serious difficulties for fabrication, for example, if the phase function is defined in terms of a multilevel function. In this case, fabrication can require the exposure of several masks and accuracy should be guaranteed with respect to each mask, relative depth of each elementary mask, and mask-to-mask alignment. If the FOV is wide enough, typically greater than 20-30 degrees full-width, binary solutions are most prevalent.

Figure 1:
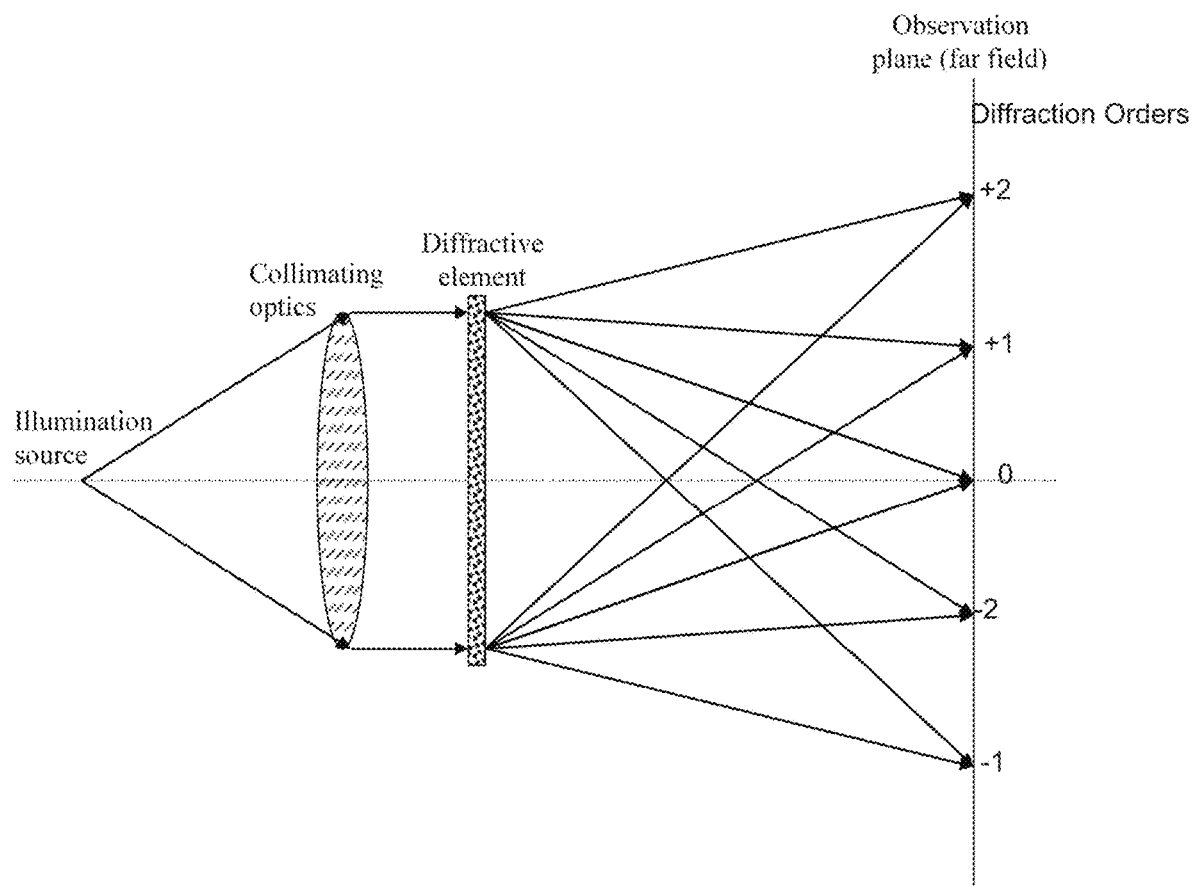
FIG. 1 is an optical diagram showing an illumination system including an illumination source providing illumination energy via collimating optics to a diffractive optical element.
Figure 2:
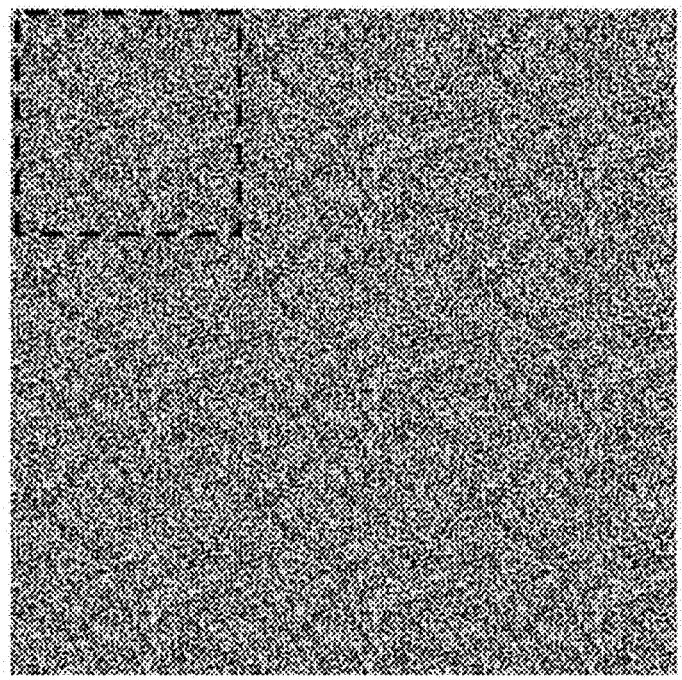
FIG. 2 is an illustration of a two-dimensional diffractive optical element of FIG. 1.
Figure 3:
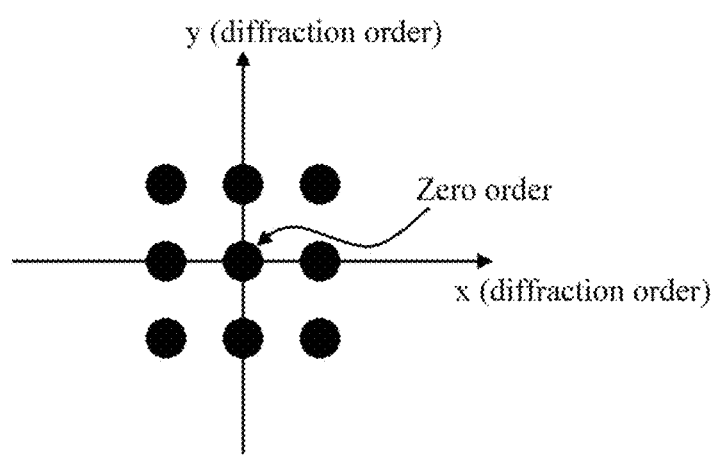
FIG. 3 is an illustration of structured light in the form of an array of 3×3 spots showing the zero diffraction order from the diffractive optical element of FIG. 1.

However, there is no method available for the design of efficient on-axis diffractive optical elements that operate with more than a single wavelength or over wide FOV. The term on-axis refers to a diffractive optical element that can project an image that contains or is defined around the zero diffraction order. A simple example of such an element project is a spot array, that is, a distribution of image spots in the far field arranged in the form of an array. An example of a spot array is shown in FIG. 2 for a 3×3 array, which includes the zero diffraction order as part of the pattern, as shown in FIG. 3. In more general situations the distribution of spots is referred to as a "structured light" pattern and constitutes a particular distribution of spots that may incorporate unique features, such as required by the detection in optical sensing applications.

For a more quantitative analysis, consider the case of a diffractive optical element designed to project a total of $N_s$ spots. For simplicity, wide FOV or broadband operation is not yet being considered. One of the easiest ways to understand the emergence of a strong zero diffraction order is through deviations from the design phase depth. This can happen either by errors in fabrication or deviation in operation from the design wavelength. These two situations can be similar in regards to their effect in the transmitted phase. So, the equivalence is used to examine the problem in terms of operation under multiple wavelengths as a way to understand sensitivity to depth without the need to consider any specific manufacturing method. At a later point phase depth errors will be directly considered. The structure of the element can be defined in terms of its phase delay but, for actual implementation, one needs to define an actual physical structure. This is done by defining a design wavelength, $\lambda_0$, and corresponding index of refraction, $n(\lambda_0)$ associated with the optical material that embodies the phase structure. If $\Phi$ represents the phase function of the element at the design wavelength, $\lambda_0$, then the phase associated with operation under wavelength $\lambda$ is given by $\alpha(\lambda)\Phi$ where $$\alpha(\lambda) = \frac{\lambda_0}{\lambda} \frac{[n(\lambda) - 1]}{[n(\lambda_0) - 1]}, \qquad (1)$$

where $n(\lambda)$ is the index of refraction at wavelength $\lambda$.

The term a can be termed the "wavelength-detuning" coefficient because it measures the separation between target design ($\alpha=1$) and actual operation. It also includes dispersion effects due to the variation of index of refraction with wavelength. For illustration purposes, consider an example of five wavelengths of operation such that $\alpha=0.8, 0.9, 1, 1.1,$ and $1.2$ (or equivalently, these can be seen as phase depth scaling errors). As an example, if the part of the electromagnetic spectrum in the visible with $\lambda_0=500$ nm and dispersion is disregarded, the wavelengths of operation would be 416.7 nm, 454.5 nm, 500 nm, 555.6 nm, and 625 nm. However, expressing the results in terms of a is a more general approach because it could refer to any particular region of the spectrum, not only the visible.

Outside of the ideal condition of operation the performance of the diffractive optical element can be affected in several ways, however, the zero diffraction order is generally the most sensitive and readily felt parameter. Other aspects such reconstruction error and efficiency can also be degraded, but they can be generally minimized while, for some set of image constraints, the zero diffraction order performance cannot be significantly improved. For these reasons, the performance measure selected is the ratio between the efficiency of the zero diffraction order and the average efficiency of the remaining spots in the structured light pattern, which is represented by the Greek letter $\rho$. If $N_s$ spots are present in the desired pattern, an upper limit for the average efficiency of each spot is given by $1/N_s$. In practice the actual diffraction efficiency can be lower than this value. Thus, there is an upper limit for $\rho$. For simplicity, it is considered that the projected image does not make use of the zero diffraction order, meaning that there is by design minimal energy concentrated at the zero diffraction order. The diffractive optical element should have a zero diffraction order efficiency at the operating wavelengths of ideally zero implying that the value of ρ at α=0.8, 0.9, 1, 1.1, and 1.2 should also be ideally zero. In practice, these values will not be zero due to the design itself or the presence of fabrication errors.

Consider the case of a diffractive optical element with only two phase levels and total phase depth Mπ, M is an odd natural number (1, 3, 5, . . . ). This means that the element can only impart a phase delay of either 0 or Mπ radians. The ratio ρ for such element is given by $$\rho = N_s \cos^2 \frac{M\pi\alpha}{2}. \quad (2)$$

The case M=1 is the usual binary diffractive optical element. It is also the easiest to fabricate because the total phase depth is only π. The values of ρ for the desired wavelength detuning are shown in Table I.

TABLE I

Ratio ρ at each wavelength detuning for a binary diffractive element that projects 100 spots according to prior art. The two phase levels are 0 and Mπ radians.

| M | α = 0.8 | α = 0.9 | α = 1.0 | α = 1.1 | α = 1.2 |
|---|---------|---------|---------|---------|---------|
| 1 | 9.5492  | 2.4472  | 0.0000  | 2.4472  | 9.5492  |
| 3 | 65.4508 | 20.6107 | 0.0000  | 65.4508 | 20.6107 |
| 5 | 100     | 50      | 0.0000  | 50      | 100     |
| 7 | 65.4508 | 79.3893 | 0.0000  | 65.4508 | 79.3893 |
| 9 | 9.5492  | 97.5528 | 0.0000  | 9.5492  | 97.5528 |

Figure 7:
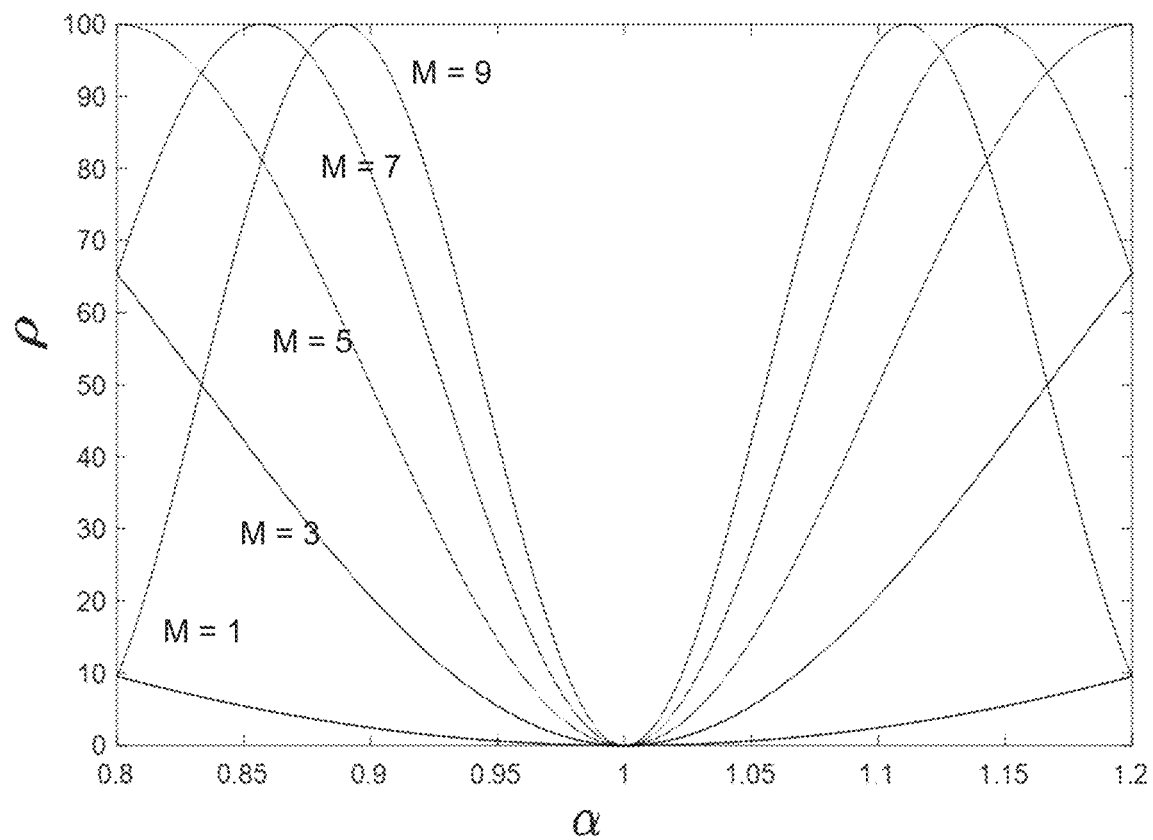
FIG. 7 is a graph showing the ratio ρ for a binary diffractive element that projects 100 spots, wherein the phase delays are 0 and 9π radians.
Figure 8A:
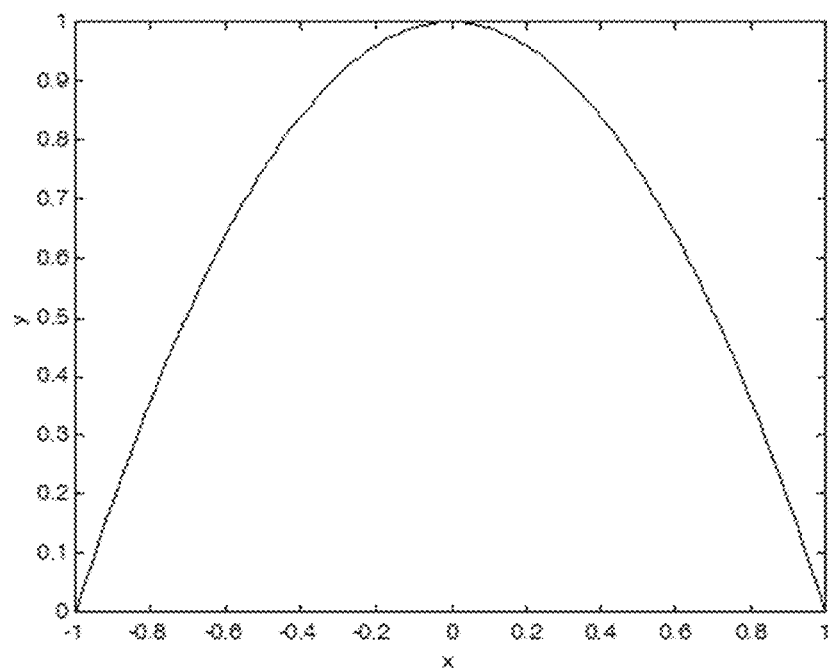
FIGS. 8A-8E show five graphs illustrating a quantization of phase function of original, 2, 4, 8, and 16 levels.
Figure 8B:
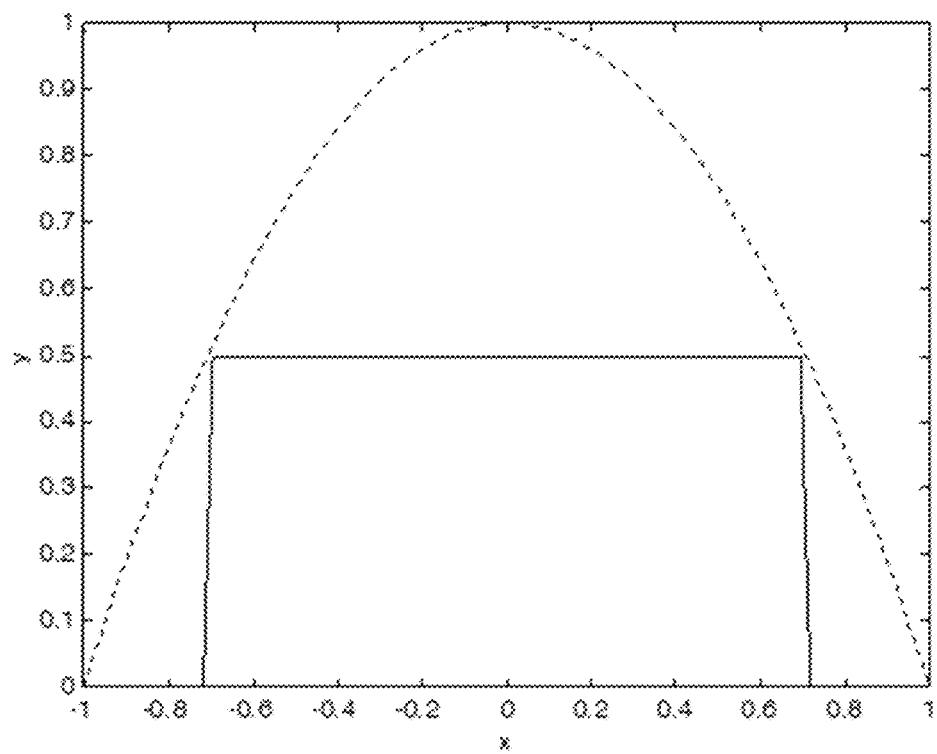
Figure 8C:
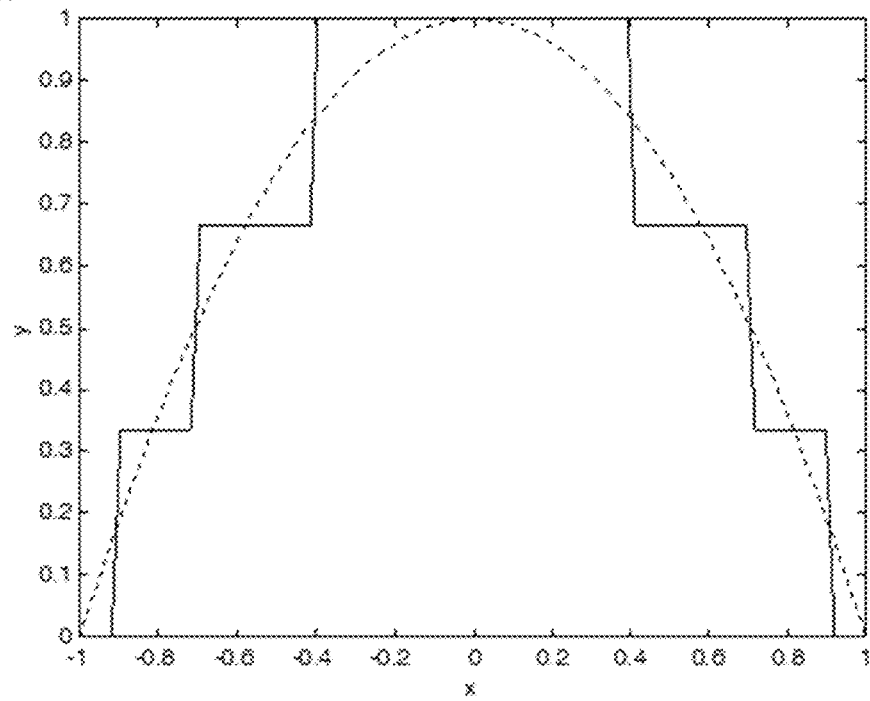
Figure 8D:
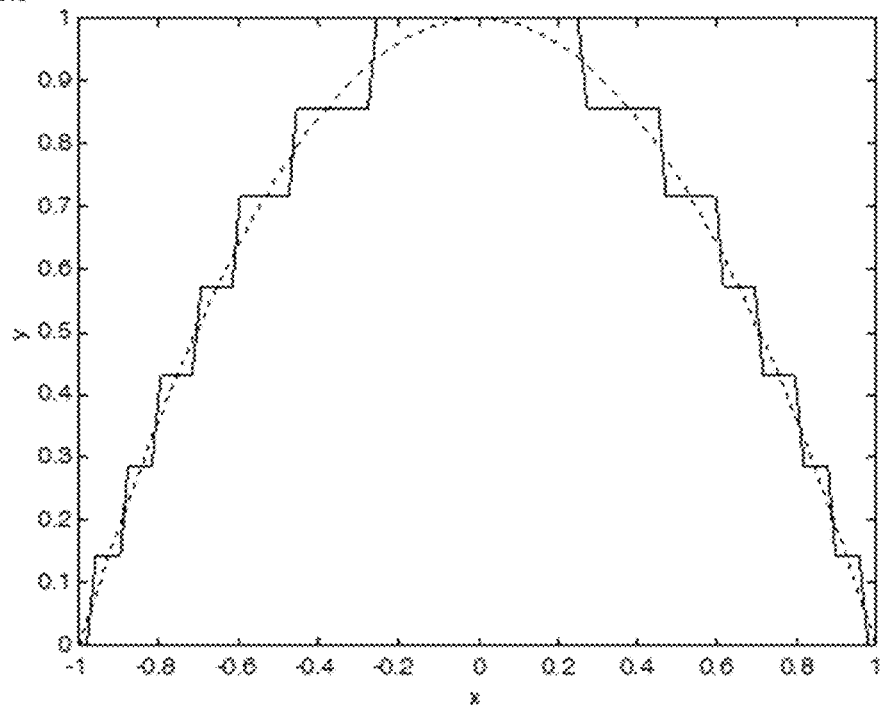
Figure 8E:
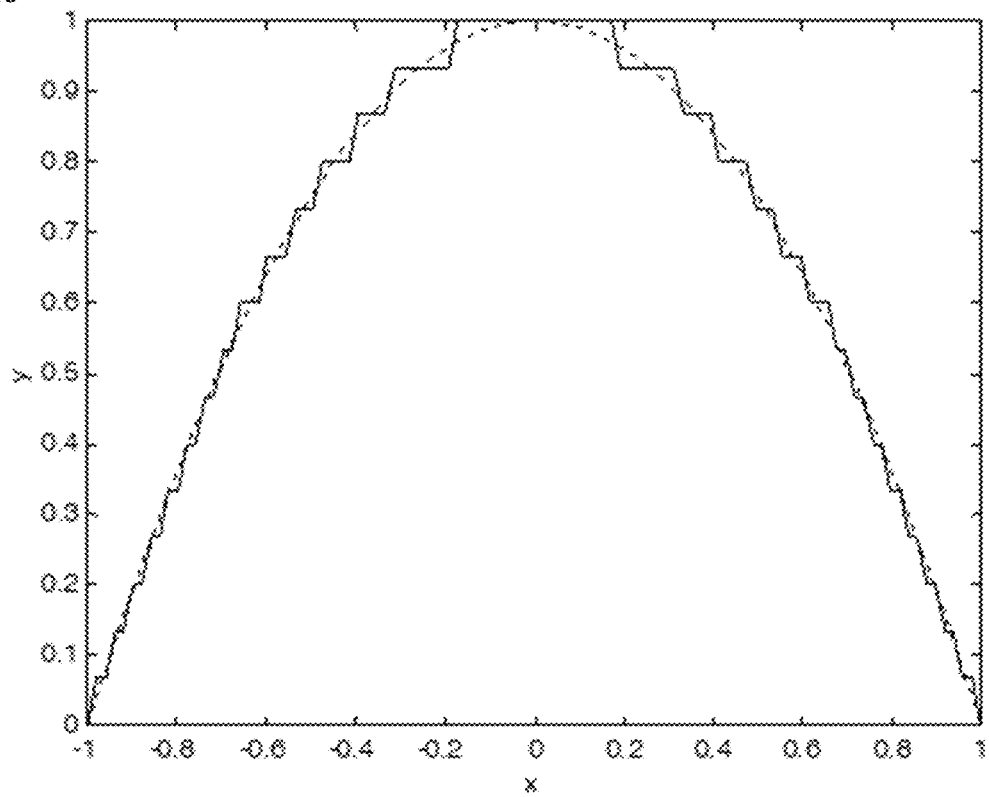

For most practical structured light applications, the total number of spots can be in the order of thousands or hundreds of thousands of spots. By way of example, a much smaller number of spots can be used to illustrate the magnitude of the problem. Note that, as Table I indicates, the best solution for the binary element occurs when the total phase depth is π, which appears to be in conflict with the concept that deeper phase delay leads to better multi-wavelength performance or, equivalently, less sensitivity to depth errors. The general performance over the continuous spectrum between α=0.8 and 1.2 is shown in FIG. 7. As soon as one considers the equivalence of wavelength detuning and depth errors, this plot clearly illustrates the strong sensitivity of the binary design, even in the case of a small number of spots.

Move outside the binary solution, consider a diffractive optical element with multiple phase levels. As a simple example consider a 4-level diffractive optical element that, once again, projects a structured light pattern of 100 spots with the zero diffraction order efficiency set to zero. In this case:

$$\rho = N_s \frac{4}{9} \left( \cos M\pi\alpha + 2\cos \frac{M\pi\alpha}{3} \right)^2, \quad (3)$$

where the total phase depth is now 2πM, and M is a natural number (1, 2, 3, . . . ). The performance for the 4-level element is shown in Table II. In comparison with the binary design, the 4-level design presents a wider variety of behavior but is not able to exhibit acceptable performance over all wavelengths of interest or phase scaling errors. As the element gets deeper, one can find narrow spectral ranges over which better performance is observed but no single depth for the structure enables acceptable performance for all specific values of α, much less broadband operation.

Once again, these results can be further degraded by fabrication errors, including mask misalignment.

TABLE II

Ratio ρ for a 4-level diffractive optical element that projects 100 spots (zero diffraction order suppressed) evaluated at several values of wavelength detuning for increasing values of the total phase depth 2πM.

| M | α = 0.8  | α = 0.9  | α = 1.0  | α = 1.1  | α = 1.2  |
|---|----------|----------|----------|----------|----------|
| 1 | 12.4489  | 2.2403   | 0.0000   | 0.8413   | 1.6211   |
| 2 | 0.4441   | 1.6211   | 0.0000   | 12.4489  | 76.1567  |
| 3 | 76.1567  | 275.5375 | 400.0000 | 275.5375 | 76.1567  |
| 4 | 339.8645 | 76.1567  | 0.0000   | 0.4441   | 1.6211   |
| 5 | 0.0000   | 0.0000   | 0.0000   | 133.3333 | 400.0000 |
| 6 | 1.6211   | 76.1567  | 400.0000 | 76.1567  | 1.6211   |
| 7 | 202.7981 | 275.5375 | 0.0000   | 1.3143   | 76.1567  |

Nevertheless, this approach provides a hint as to the optimal design approach described later below: namely, simultaneously increase the number of phase levels and increase the total phase depth. However, just increasing the total depth may not be enough to meet the design performance criteria, as seen above, and adding phase levels runs into other difficulties, primarily related to manufacturing challenges, especially as the number of spots increases as in the case of the wide FOV. The solution provided by the present invention is to move away from diffractive optical elements with discrete levels and consider continuously-varying, grayscale phase profiles. In this case, the constraint on phase levels can be eliminated and the phase profile can assume any value without limitation.

Before moving further, the following definitions are provided. The first step can be the construction of the structured light pattern. This means the number and distribution of spots of interest within a given FOV. Computationally, the projected image and the phase function are defined as a matrix with R rows and C columns. The total number of pixels is then N=R×C. A complex transmission function needs to be determined of the diffractive optical element that provides beam-splitting which propagates under the laws of diffraction to generate the desired structured light pattern. For maximum efficiency, phase-only solutions are provided, although the process is generally applicable to complex (phase and amplitude) transmission functions as well. The design process itself can be iterative, which involves repeated propagation between the image and beam-splitter planes, each step involving correction factors in such a way that, after a sufficient number of iterations, a satisfactory solution can be found. Such iterative design method is well-known with the prototypical implementation described in the seminal work of Gerchberg and Saxton ("A practical algorithm for the determination of phase from image and diffraction plane pictures", R. W. Gerchberg and W. O. Saxton, Optik 35 (2), 237-246), the disclosure of which is hereby incorporated by reference in its entirety.

The iterative design can provide a solution with a phase delay that varies continuously for every pixel. In practice, even grayscale phase profiles involve some quantization, typically as an 8-bit (256 phase levels) or 16-bit (65535 phase levels) pattern which, for all practical purposes, can be regarded as continuous. As an illustration, note that if Φ represents the phase function, then the discrete phase values are defined as $\Phi_k = 2\pi k/(L-1)$, k=1, 2, . . . , L, with L the total number of levels (assume total phase is 2π for now). Examples of phase quantization are shown in FIGS. 8A-8E. At 16 levels (FIG. 8E) the quantization provides a good match to the original continuous profile. If the goal of the phase quantization is to mimic as best as possible the continuous profile, then the 8-bit depth (FIG. 8D) or 16-bit depth (FIG. 8E) can be effective.

Figure 9:
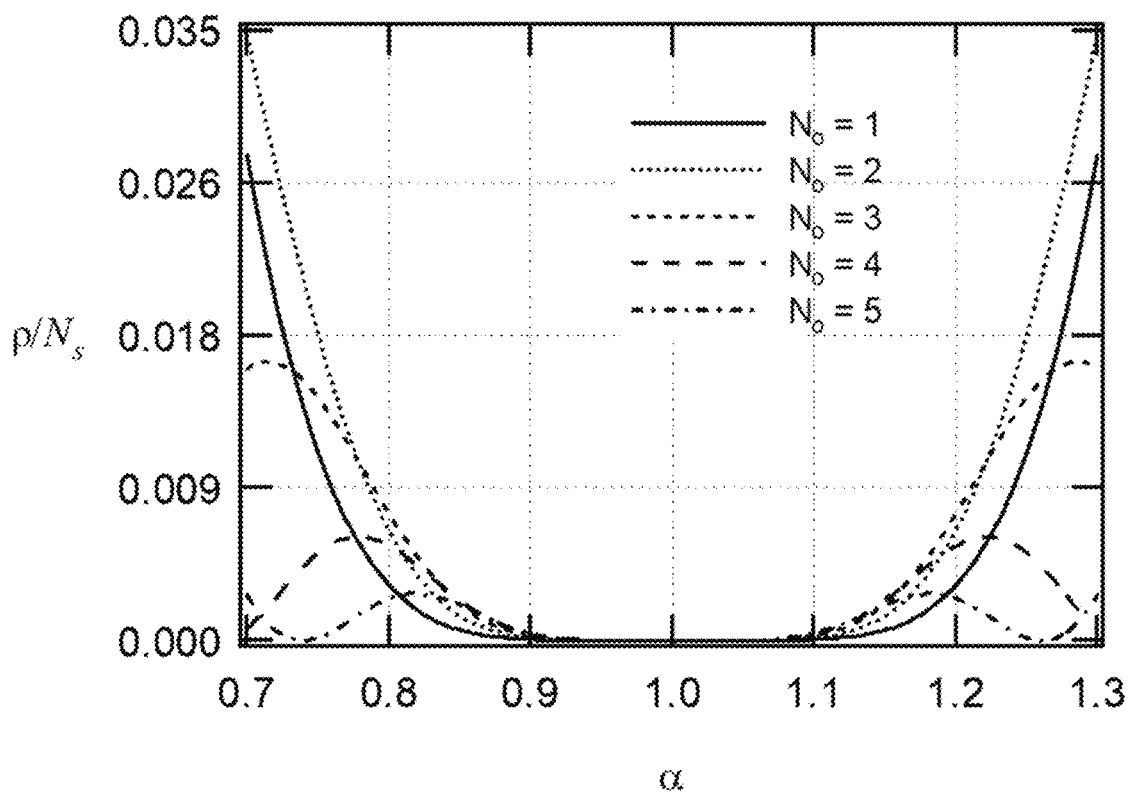
FIG. 9 is a graph shown a normalized ratio ρ/Ns as a function of wavelength detuning (α) for a π-diffractive element with π phase shift when $N_e=N_0+1$.

As an interesting side note, a three-level DOE can be quite effective at addressing the zero diffraction order issue as presented by V. Kettunen, J. Simonen, M. Kuittinen, O. Rippoll, and H. P. Herzig, "Diffractive elements designed to suppress unwanted zero order due to surface depth error," in OSA *Trends in Optics and Photonics (TOPS), Vol. 75, Diffractive Optics and Micro-Optics*, OSA Technical Digest, Postconference Edition (Optical Society of America, Washington DC, 2002), pp. 58-60 and also disclosed by U.S. Pat. No. 6,118,559, the disclosures of both of which are hereby incorporated by reference in their entirety. In this case, the previously defined ratio ρ can be shown to equal:

$$\rho = \frac{N_s}{N_o^2} \frac{\sin^2 \pi N_o \alpha}{\sin^2 \pi \alpha} \cos^2 \frac{\pi \alpha}{2}, \text{ if } N_e = N_o, \quad (4)$$

$$\rho = N_s \left[ \frac{N_o \sin \pi \alpha (N_o + 1) + (N_o + 1) \sin \pi \alpha N_o}{2 N_o (N_o + 1)} \right]^2, \quad (5)$$
if $N_e = N_o + 1$.

where $N_e$ is the number of phase levels that are even multiples of π (including zero) and $N_o$ is the number of phase levels that are odd multiples of π. As an example, if the phase function contains the phase levels 0, π, and 2π, then $N_e=2$ and $N_o=1$. It is clear that only two combinations are possible: either $N_e=N_o$ or $N_e=N_o+1$. It is also assumed that the zero order diffraction efficiency is set to zero by design. The plot in FIG. 9 illustrates performance in this case. While the 3-level solution can in principle offer improved zero-order performance, the discrete nature of the pattern can still require multi-mask fabrication methods that can be very challenging for large number of spots or wide FOV. Again, in the solution provided by the present invention the phase functions for the diffractive optical element can be defined by a continuously varying phase profile that can be fabricated without the need for multiple masks.

Thus, given a certain structured light pattern, the phase function can be calculated via an iterative design approach, according to the Gerchberg-Saxton method, or by other iterative design as desired. Such design methods mostly make use of successive propagation between the phase plane and the image plane by using Fast Fourier Transforms. The design cycle ultimately provides a phase function unit cell that is defined within a range of –π to π, for a total 2π phase shift. As the absolute phase value is of no consequence, only the total phase delay is considered. The solution that enables the diffractive optical element 10 of the present invention operation without the zero diffraction order issue will now be described.

To increase the total phase depth of the phase structure, a technique named "phase unwrapping" is used. Typical iterative design methods calculate a phase function mathematically in terms of an arctangent operation. As a result, at a given location, it can only provide phase values that are in the interval between –π to π. In general, the phase function at a given point (x,y) can be described by the general relation $$\Phi_P(x,y) = \Phi_0(x,y) + 2\pi P(x,y), \quad (6)$$

where $\Phi_0$ represents the phase map the phase values wrapped into a total 2π phase range. The function $\Phi_P$ represents the phase map with P(x,y) an integer number, where the phase is unwrapped by adding or subtracting integer multiples of 2π to remove, as much as possible, discontinuities in the phase function. For simplicity, P(x,y) is written as P with the implicit understanding that it is a function of phase map location. The phase function resulting from the iterative design method is given by $\Phi_0$ and it is said that the calculated phase is wrapped to a modulo-2π. In other words, the total phase depth is constrained to a total 2π phase range.

While unwrapping a phase function has been used in optical design, heretofore the present invention it has not been applied to diffractive optical elements providing structured light. For example, phase unwrapping has been used for diffraction tomography, as described in U.S. Pat. No. 4,562,540 to Devaney, ophthalmic lenses with a diffractive phase element, as described in U.S. Patent Publication No. 20100321635 to Apter et al., and even in interferometry as described in U.S. Pat. No. 9,921,111 to Bahk for removing discontinuities in a phase function, the disclosures of all of which are hereby incorporated by reference in their entirety.

Figure 10:
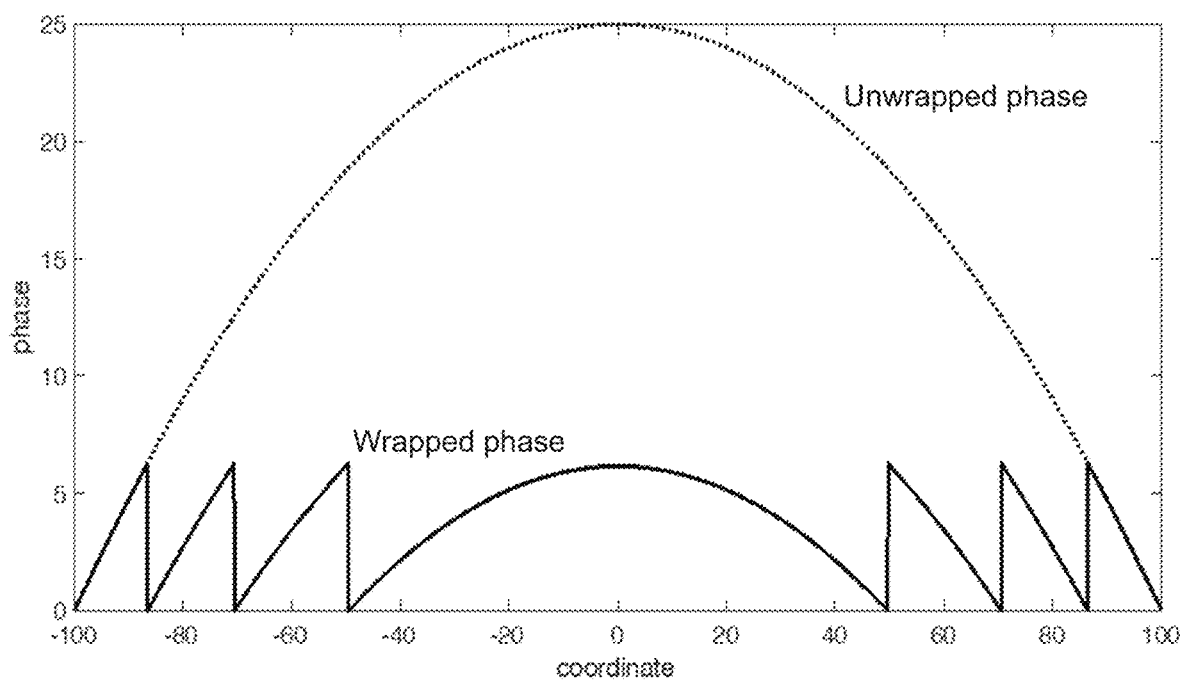
FIG. 10 is a graph illustrating the 2π-wrapping of a diffractive lens phase profile (solid line) from a typical lens phase profile (dotted line)

Wrapping a phase function to modulo-2π, or equivalently 2π-wrapping, is also described for example in defining a diffractive lens in D. A. Buralli, G. M. Morris, and J. R. Rogers, "Optical performance of holographic kinoforms," Appl. Opt. 28, 976-983 (1989), the disclosure of which is hereby incorporated by reference. The process is exemplified in FIG. 10. In the case of a diffractive lens, one intentionally wraps the lens phase to create a very thin element. From this type of phase profile emerges the unique properties of diffractive lenses. In the case of phase functions for structured light patterns the method typically produces a 2π-wrapped phase, given by $\Phi_0$, and the concept of the present invention is to actually unwrap that phase profile to obtain a deeper phase pattern, contrary to what is done in prior art.

While in the case of a diffractive lens the wrapping and unwrapping operations are fairly straightforward, the more general phase structures that produce structured light patterns for diffractive optical element 10, can use, for example, the computational methods applied for phase unwrapping described in the book by Dennis C. Ghiglia and Mark D. Pritt, *Two-Dimensional Phase Unwrapping: Theory, Algorithms, and Software*, Wiley-Interscience, 1st ed., 1998, the disclosure of which is hereby incorporated by reference. However, other phase unwrapping methods can also be used. To illustrate the concept of the present invention, consider for simplicity the case of one-dimensional phase profiles. The principle is the same as in the general two-dimensional phase profiles, but is easier to visualize. Most importantly, the behavior of the zero diffraction order is similar in both cases.

Figure 12:
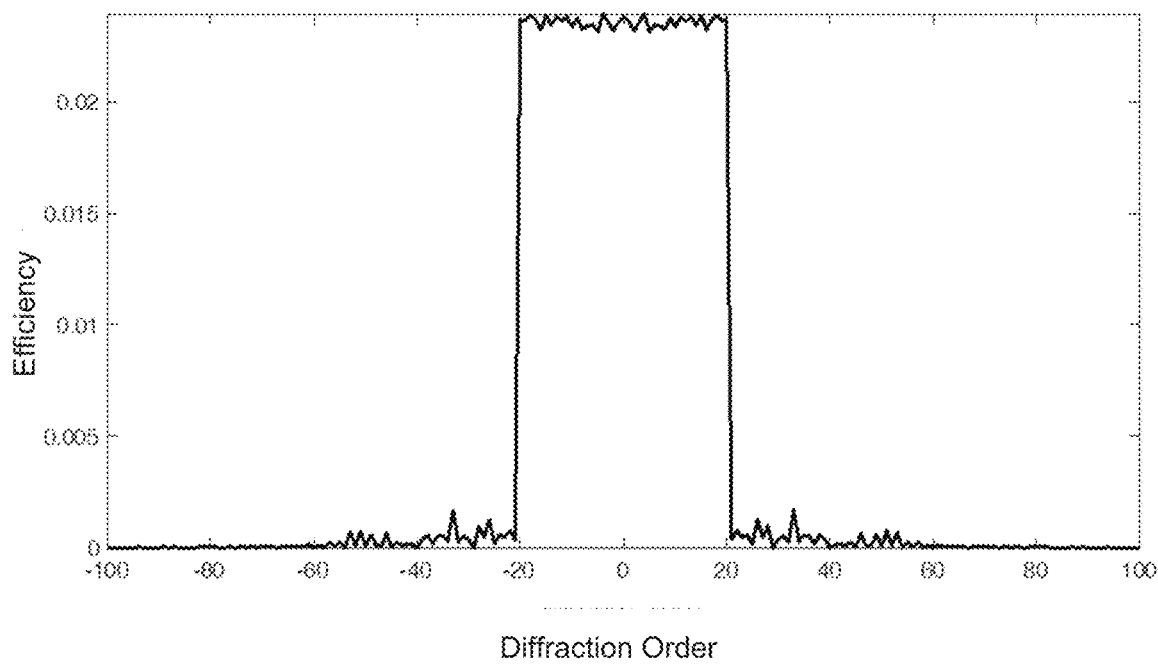
FIG. 12 is a graph of the one-dimensional diffraction pattern produced by the ideal phase profile of FIG. 10 showing −20 to +20 diffractive orders which generates 41 spots or beamlets.
Figure 13:
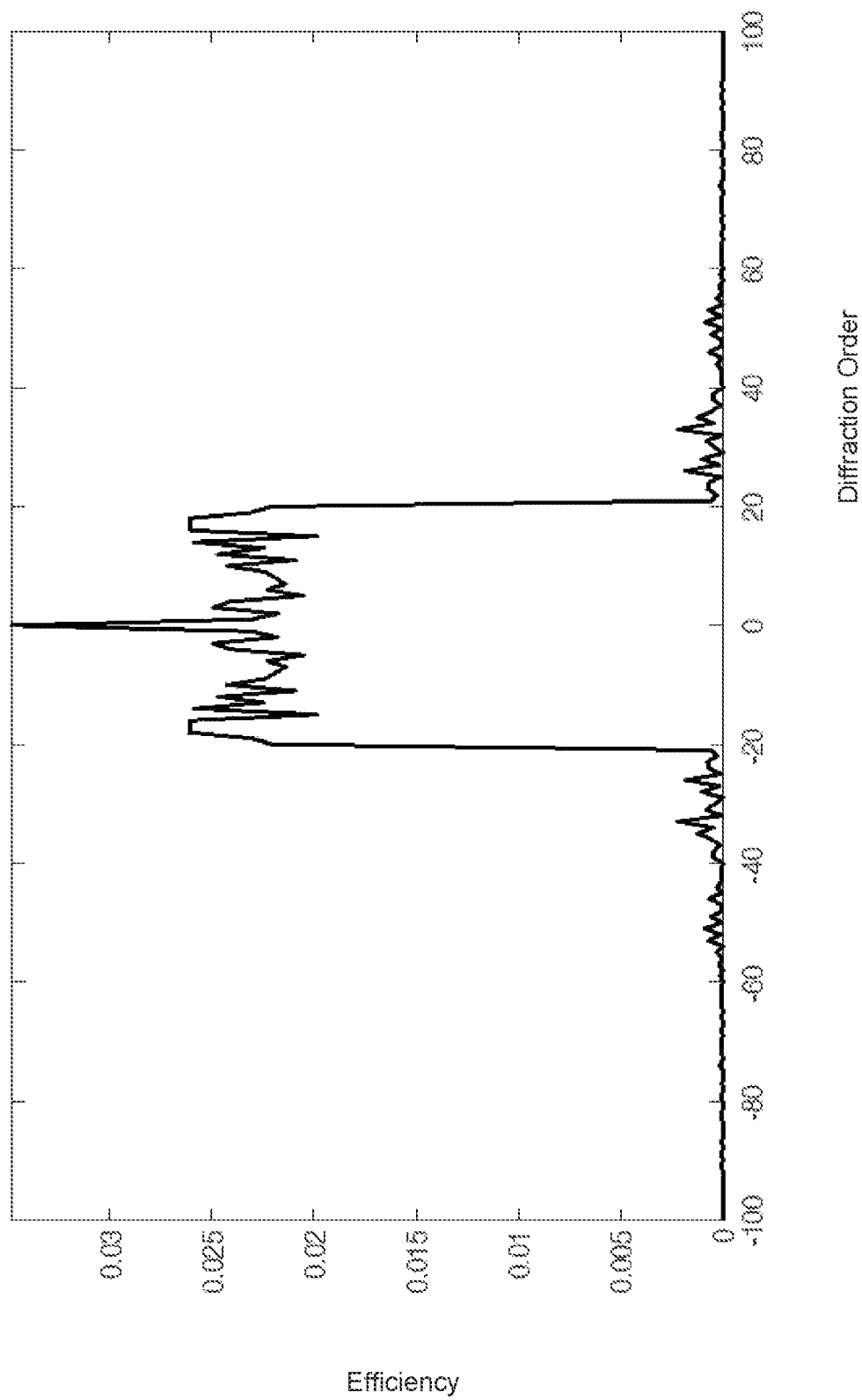
FIG. 13 is a graph of the diffraction pattern produced by the phase profile of FIG. 11 with 5% depth error showing higher intensity (or power) of the zero diffractive order compared to other orders in terms of efficiency of illumination outputted.

As an example, consider the phase profile shown in FIG. 11 that generates a very simple distribution of 41 spots or beamlets. The diffraction pattern produced by the ideal phase profile of FIG. 11 is shown in FIG. 12. As soon as some degree of error is introduced, however, the ideal performance is lost. This is exemplified in FIG. 13 for the case of 5% error in phase depth. As expected from the previous discussion, the main consequence of the deviation from the ideal phase is the quick increase in zero diffraction order intensity. One also notices a degradation of the uniformity of the various diffraction orders of interest. A typical measure of uniformity error 6 is given by the following expression:

$$\sigma = \frac{I_{max} - I_{min}}{I_{max} + I_{min}} 100\%, \quad (6)$$

where $I_{max}$ and $I_{min}$ are the maximum and minimum intensity values, respectively, among the orders of interest. For this particular example, the theoretical uniformity is 1.68%. With the 5% phase depth error, the uniformity error increases to 13.45% not including the zero diffraction order.

Figure 14:
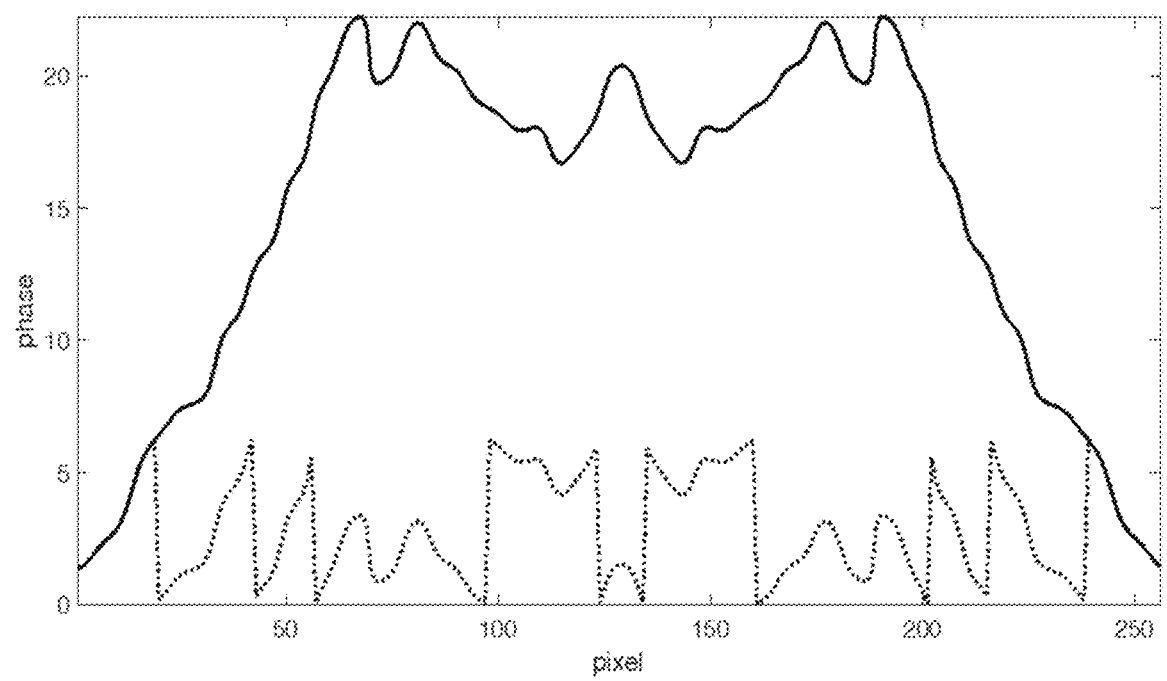
FIG. 14 is a graph of phase profile of an 8π-wrapped phase profile form (solid line) of the initial phase profile of FIG. 11 when fully unwrapped, wherein the initial phase profile of FIG. 11 (dotted line) is shown to illustrate the reduction in phase discontinuities in the 8π-wrapped phase profile.
Figure 15:
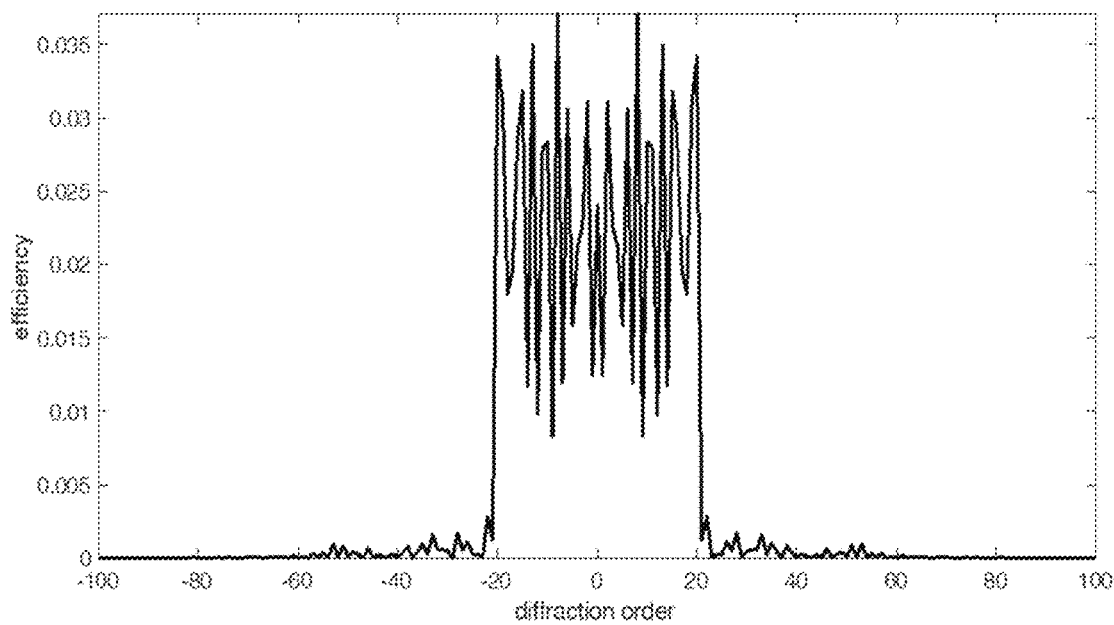
FIG. 15 is a graph of the diffraction pattern produced by the 8π-wrapped phase profile of FIG. 14 with a 5% depth error showing excessive uniformity intensity error among the 41 diffractive orders.

The unwrapped phase profile is shown in FIG. 14. If the diffraction pattern is calculated with the unwrapped phase profile, including the 5% phase depth error, the result shown in FIG. 15 is obtained. One immediately notices that the diffraction pattern no longer shows a strong isolated zero order. It has been found that complete unwrapping of the phase profile is undesirable, even though the total phase depth is maximum and, therefore, expected to completely eliminate the strong zero order. The reason is that, while the deeper phase profile addresses the zero diffraction order issue, it also increases the uniformity error. In the example of FIG. 15, σ=63.29%, a significant degradation of the uniformity compared to the original 2π-wrapped phase profile. If, however, one considers the same phase profile but 4π-wrapped, the performance improves significantly, as shown in FIG. 16. Now, the uniformity error is given by σ=18.66%, marginally worse than the original 2π-wrapped phase profile at the same level of phase depth error, but an acceptable criteria of uniformity error depending on the particular application. The corresponding 4π-wrapped compared to the original 2π-wrapped phase profile is shown in FIG. 17. In a more general case, the optimum degree of unwrapping needs to be determined and is generally dependent on the structured light pattern as well as other parameters, such as FOV and the types of phase error that might be introduced by the manufacturing method. Nevertheless, this example shows the method for generating a diffractive optical element 10 as shown in the block diagram shown in FIG. 18.

A method for generating a diffractive optical element can include calculating a phase profile that produces a structured light pattern (step 21); unwrapping the phrase profile of the structured light pattern to obtain a 2πP unwrapped phase profile, wherein P is selected to add or substrate integer multiples of 2π in order to reduce discontinuities in the 2πP unwrapped phase profile (step 22); generating the 2πP unwrapped phase profile (step 25); and fabricating microstructures along a surface of an optical material based upon the generated 2πP unwrapped phase profile (step 26). The method can also include defining a structured light pattern (step 20). The method can also include evaluating the performance of the obtained 2πP unwrapped phase profile (step 23). The method can also include optimizing P (step 24). The method yields a diffractive optical element 10 that can exhibit a zero diffraction order having substantially the same intensity as other diffraction orders in a plurality of diffraction orders.

The method can include defining the structured light pattern to be produced (step 20) by the diffractive optical element 10. In an aspect, the number of spots in the structured light pattern as well as their distribution, design wavelength, and FOV can be defined. Non-limiting exemplary structured light patterns include spots, dots, beamlets, lines, geometric shapes, arrays, or combinations thereof.

The method can include calculating the phase profile for diffracting light in a plurality of diffraction orders to provide the defined structured light pattern (step 21). The calculation involves, for example, the use of the Gerchberg-Saxton algorithm or one of its variations. The result of step 21 can be a fully wrapped phase profile, as shown in the earlier example of FIG. 11, where FIG. 11 is a calculated phase profile, φ₀, 2π-wrapped for a one-dimensional structured light pattern of 41 spots or diffraction orders.

The method can include unwrapping the calculated phase profile to obtain an optimal level of unwrapping. Using iterative unwrapping methods as described above, one or several cycles of unwrapping of the phase profile occurs (step 22), and each cycle is evaluated (step 23). In the example of FIG. 11, see the calculated diffraction pattern of FIG. 15 for the phase profile of FIG. 14, or the calculated diffraction pattern of FIG. 16 for the phase profile of FIG. 17 for a set depth error of 5%. Other error than 5% can be set as desired.

The method includes optimizing the value of P to minimize the zero diffraction order while providing comparable uniformity to the 2πP unwrapped phase profile (step 24). In other words, P is selected by adding or subtracting integer multiples of 2π in order to reduce discontinuities in the 2πP unwrapped phase profile until the zero diffraction order is substantially the same in intensity (or power) as other diffraction orders of the plurality of diffraction orders.

In the example of one-dimensional structured light pattern of 41 spots or diffraction orders, the results of steps 22 and 23 is shown by the solid line of phase profile of FIG. 17, which represents a phase profile at least partially unwrapped, because unwrapping less than full is desired to avoid excessive uniformity intensity error. The original phase profile of FIG. 11 for comparison is shown as a dotted line in FIG. 17 in order to show the reduce discontinuities in the resulting 2πP unwrapped phase profile. FIG. 17 profile is less than fully unwrapped as shown in FIG. 14 (i.e., complete unwrapping of function φ₀) because such would lead to excessive uniformity error, as shown in FIG. 15. The more limited unwrapping as shown in FIG. 17 leads to satisfactory performance with minimal degradation of the uniformity error compared to the ideal solution in the presence of phase depth errors. In practice, additional sources of errors can be used to evaluate performance with minimal degradation of the uniformity error compared to the ideal solution in the presence of phase depth errors. In practice, additional sources of errors may be used to evaluate performance against those to ascertain the optimum degree of unwrapping. For example, rounding of corners and sharp edges may play a role in addition to depth errors. This particular example of a one-dimensional pattern was selected for the simple reason that it can be easily visualized and explained. However, the same process can be directly extended to more complex structured light patterns or two-dimensional geometry, with the only difference being in the initial phase function at step 21 and unwrapping methods of steps. 22 and 23 for two-dimensional.

Once the optimum P is identified at step 24, the method can include generating the 2πP unwrapped phase profile s at step 25 by using the formula:

$$s = \frac{\Phi_P}{2\pi} \frac{\lambda_0}{(n-1)}, \quad (7)$$

where $\Phi_P$ is the 2πP-unwrapped phase profile. The same approach can be applicable in the case of complex structured light patterns, independent of the number of spots, in 1D or 2D geometry. Again, the example of a linear spot pattern was used for easy visualization and clarity of explanation, but a different 1D or 2D structured light pattern can be defined at step 20.

The method can include fabricating microstructures along a surface of an optical material 12 based upon the generated 2πP unwrapped phase profile. This can result in microstructures 11 along a surface 14a having a 2πP unwrapped phase profile that resulted from steps 22-24. The 2πP unwrapped phase profile can diffract input illumination into structured light having a zero diffraction order which is substantially the same in intensity as other of the diffraction orders. The 2πP unwrapped phase profile defining the microstructures can be periodic along surface 14a, such that the 2πP unwrapped phase profile is repeated in each unit cell of the diffractive optical element 10. An example of a unit cell of a 3×3 array of cells is shown in FIG. 2, but the number of cells along surface 14a depends on the particular application of the diffractive optical element 10.

The fabrication of microstructures, along a surface of an optical material, having a 2πP unwrapped phase profile determined from Eq. (7) at step 25, can be performed by a variety of techniques. For example, the fabrication can be direct laser writing as described in U.S. Pat. No. 6,410,213, the disclosure of which is incorporated by reference, which utilizes a focused laser beam to expose photosensitive resist that has been coated on a substrate. The laser beam can be modulated as it scans a surface 14a of the optical material 12 so that after development one obtains a continuous analog surface. Laser writing can produce the phase structure in a photoresist, which can then be transferred into other materials by other techniques such as micro-replication or electroplating. In this fashion a durable master can be generated to produce the component in larger quantities such as hot embossing, injection-molding, or replication. The photoresist or a suitable replica of the pattern can also be transferred into another optical material 12 by means of a reactive-ion etching process or ion-beam milling or similar methods.

As stated earlier, second surface 14b and second external surface 16b can have microstructures 17 which may be the same or different from microstructures 11 of the first surface 14a and first external surface 16a. If microstructures 17 are desired, steps 20-26 can be repeated to provide surface 17 having a desired structured light pattern using an input illumination the structured light pattern provided from surface 12. Where microstructures 17 can be a mirror image of microstructures 11, only step 26 fabrication is performed.

One of the primary functions of the diffractive optical element can be to distribute illumination over a specified region of space with each individual beam associated with a particular direction or, similarly, location in space and intensity. The distribution of beams from a given input beam can be accomplished with high efficiency and without the presence of a zero diffraction order hot spot.

The diffractive optical element can be used in many applications, including but not limited to facial recognition in-cabin monitoring (for example, automobiles), LIDAR, etc.

From the foregoing description, it will be apparent that there have been provided diffractive optical elements for diffracting an input illumination beam into a structured light pattern. Variations and modifications in the herein described optical elements and method in accordance with the invention will undoubtedly suggest themselves to those skilled in the art. Accordingly, the foregoing description should be taken as illustrative and not in a limiting sense.

What is claimed is:

1. A diffractive optical element comprising:
   an array of unit cells along a surface of an optical material, wherein each unit cell includes microstructures having a phase profile that diffracts input illumination into structured light of a plurality of different diffraction orders;
   wherein the phase profile is a 2πP-partially unwrapped phase profile that is at least partially phase unwrapped, but less than a completely unwrapped phase profile, and is repeated in each unit cell of the array, the 2πP-partially unwrapped phase profile including discontinuities, the discontinuities being reduced compared to the completely wrapped phase profile; and
   wherein P is an integer that minimizes intensity of the zero diffraction order within a criteria of uniformity intensity error of the diffraction orders of structured light outputted from the diffractive optical element so that intensity of light in each of the plurality of diffraction orders is substantially the same, in the event a phase depth error is present in the phase profile.

2. The diffractive optical element of claim 1, wherein the surface extends along one or two dimensions each orthogonal to the depth dimension along which the phase profile extends.

3. The diffractive optical element of claim 1, wherein the optical material is a single optical material.

4. The diffractive optical element of claim 3, wherein the surface of the single optical material is a first surface that is opposite a second surface of the single optical material.

5. The diffractive optical element of claim 4, wherein the second surface has microstructures that are the same as the microstructures along the first surface of the single optical material.

6. The diffractive optical element of claim 4, wherein the second surface has microstructures that are different from the microstructures along the first surface of the single optical material.

7. The diffractive optical element of claim 4, wherein the second surface is flat.

8. The diffractive optical element of claim 1, wherein the optical material is a composite optical material including two or more different optical materials.

9. The diffractive optical element of claim 8, wherein the composite has a first external surface that is opposite a second external surface.

10. The diffractive optical element of claim 9, wherein the second external surface has microstructures that are the same as the microstructures along the first external surface of the composite optical material.

11. The diffractive optical element of claim 9, wherein the second external surface has microstructures that are different from the microstructures along the first external surface of the composite optical material.

12. The diffractive optical element of claim 9, wherein the second external surface is flat.

13. The diffractive optical element of claim 1, wherein the phase depth error is present in the phase profile and the phase depth error is 5% or more.

14. The diffractive optical element of claim 1, wherein the phase depth error is present in the phase profile and the phase depth error is 5%.

15. A diffractive optical element comprising:
   microstructures, along a surface of an optical material, having a phase profile to diffract input illumination into structured light of a plurality of different diffraction orders; and
   wherein the phase profile is $$s = \frac{\Phi_P}{2\pi} \frac{\lambda_0}{(n-1)},$$

where $\Phi_P$ is a $2\pi P$-unwrapped phase profile that is at least partially phase unwrapped, but less than a completely unwrapped phase profile, n is an index of refraction of the surface, $\lambda_0$ is a central wavelength, and P is an integer selected which minimizes intensity of the zero diffraction order within a criteria of uniformity intensity error of the diffraction orders of structured light outputted from the diffractive optical element so that intensity of light in each of the plurality of diffraction orders is substantially the same, in the event a phase depth error is present in the phase profile.

* * * * *